United States Patent
Wong et al.

(10) Patent No.: US 9,904,731 B2
(45) Date of Patent: *Feb. 27, 2018

(54) DIRECT SERVICE LAUNCH ON A SECOND DISPLAY

(71) Applicants: Sony Corporation, Tokyo (JP); Sony Network Entertainment International LLC, Los Angeles, CA (US)

(72) Inventors: Ling Jun Wong, Champaign, IL (US); Charles McCoy, Coronado, CA (US); True Xiong, San Diego, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/514,236

(22) Filed: Oct. 14, 2014

(65) Prior Publication Data

US 2015/0032736 A1 Jan. 29, 2015

Related U.S. Application Data

(63) Continuation of application No. 13/207,560, filed on Aug. 11, 2011, now Pat. No. 8,862,612.
(Continued)

(51) Int. Cl.
*G06F 17/30* (2006.01)
*H04N 21/258* (2011.01)
(Continued)

(52) U.S. Cl.
CPC . *G06F 17/30864* (2013.01); *H04N 21/25825* (2013.01); *H04N 21/25866* (2013.01);
(Continued)

(58) Field of Classification Search
USPC .................................. 707/769, 694, 706, 781
See application file for complete search history.

(56) References Cited

U.S. PATENT DOCUMENTS 5,799,292 A * 8/1998 Hekmatpour ......... G06F 3/0481
706/11
6,005,565 A 12/1999 Legall et al.
(Continued)

FOREIGN PATENT DOCUMENTS

CN 1404685 3/2003

*Primary Examiner* — Cam-Linh Nguyen
(74) *Attorney, Agent, or Firm* — Mayer & Williams PC; Mark D. Wieczorek

(57) ABSTRACT

Apparatus and methods to implement a technique for using a second display with a network-enabled television. In one implementation, this feature allows the native application on the second display to directly launch the second display application with a requested search term so that the user is immediately brought to a search page with relevant search results. The search term may be derived from the native application which in turn derives from the context of the IP TV. Such a context could be metadata from a currently playing BD from a BD player or TV channel. The second display application may be a web application or a native remote controller application. The second display could be a smart phone that can often be found beside the user, or a laptop or tablet PC, a desktop PC, or the like.

42 Claims, 13 Drawing Sheets

Related U.S. Application Data

(60) Provisional application No. 61/441,899, filed on Feb. 11, 2011.

(51) Int. Cl.
*H04N 21/266* (2011.01)
*H04N 21/41* (2011.01)
*H04N 21/436* (2011.01)
*H04N 21/482* (2011.01)
*H04N 21/643* (2011.01)
*H04N 21/6547* (2011.01)

(52) U.S. Cl.
CPC ....... *H04N 21/266* (2013.01); *H04N 21/4122* (2013.01); *H04N 21/4126* (2013.01); *H04N 21/43615* (2013.01); *H04N 21/4828* (2013.01); *H04N 21/64322* (2013.01); *H04N 21/6547* (2013.01)

(56) References Cited

U.S. PATENT DOCUMENTS

| | | | |
|---|---|---|---|
| 6,184,877 B1 | 2/2001 | Dodson et al. | |
| 7,797,301 B1* | 9/2010 | Baird | G06F 17/30637 707/706 |
| 7,886,318 B2* | 2/2011 | Wang | H04N 7/162 380/231 |
| 8,156,094 B2* | 4/2012 | Jhaveri | G06F 17/30696 707/705 |
| 8,810,512 B2* | 8/2014 | Andersson | G06F 1/1626 345/158 |
| 9,015,140 B2 | 4/2015 | Wu | G06F 17/30867 707/706 |
| 2001/0011251 A1* | 8/2001 | Sugahara | H04H 60/16 705/51 |
| 2002/0107941 A1 | 8/2002 | Katz et al. | |
| 2005/0005143 A1* | 1/2005 | Lang | G11B 20/00086 713/193 |
| 2005/0038809 A1 | 2/2005 | Abajian et al. | |
| 2007/0024412 A1* | 2/2007 | Wang | H01C 7/027 338/22 R |
| 2008/0034029 A1 | 2/2008 | Fang et al. | |
| 2008/0140606 A1* | 6/2008 | Clark | G06F 17/30864 |
| 2008/0175569 A1* | 7/2008 | Johnson | H04N 21/8586 386/232 |
| 2008/0263007 A1* | 10/2008 | Schmidt | G06F 17/30383 |
| 2009/0024650 A1* | 1/2009 | Kamani | G06F 17/30943 |
| 2009/0063649 A1 | 3/2009 | Yamagishi | |
| 2009/0100447 A1* | 4/2009 | Beynon | G06F 17/24 719/329 |
| 2009/0113475 A1 | 4/2009 | Li | |
| 2009/0150553 A1 | 6/2009 | Collart et al. | |
| 2009/0263102 A1* | 10/2009 | Shimada | G11B 20/00086 386/252 |
| 2009/0276334 A1 | 11/2009 | Hosoda et al. | |
| 2010/0162164 A1 | 6/2010 | Kwon et al. | |
| 2010/0231533 A1* | 9/2010 | Chaudhri | G06F 3/04817 345/173 |
| 2010/0242077 A1 | 9/2010 | Kota et al. | |
| 2011/0113445 A1 | 5/2011 | Lee | |
| 2011/0276585 A1 | 11/2011 | Wagner et al. | |
| 2012/0117058 A1* | 5/2012 | Rubinstein | G06Q 30/0601 707/723 |
| 2012/0117587 A1* | 5/2012 | Pedlow | H04N 21/4122 725/25 |
| 2012/0117588 A1* | 5/2012 | McCoy | H04N 21/4122 725/28 |
| 2012/0117590 A1* | 5/2012 | Agnihotri | H04N 21/25816 725/30 |
| 2014/0041051 A1* | 2/2014 | Meketa | G06F 21/10 726/28 |

* cited by examiner

DIRECT SERVICE LAUNCH ON A SECOND DISPLAY

CROSS-REFERENCE TO RELATED APPLICATIONS

This application is a continuation of U.S. Ser. No. 13/207,560, filed Aug. 11, 2011, now U.S. Pat. No. 8,862,612, issued Oct. 14, 2014, which claims benefit of priority of U.S. Provisional Patent Application Ser. No. 61/441,899, filed Feb. 11, 2011, entitled "DIRECT SEARCH FROM IPTV REMOTE NATIVE APPLICATION TO WEB APPLICATION ON SECOND DISPLAY", owned by the assignee of the present application and herein incorporated by reference in its entirety.

BACKGROUND

Internet delivery of digital content to IPTVs continues to increase, as does the popularity of IPTVs themselves. In these systems, content delivery is often performed after searches initiated by users of content service providers. However, performing such searches is cumbersome. While some current systems have been made more convenient by the provision of powerful remote controls on which searches may be entered, the user is still required to perform the manual action of opening a remote control application, navigating to a search field, and entering a search term.

SUMMARY

Systems and methods are provided that allow a user to directly launch a second display application with a requested search term from within the context of a native application on a second display, including a browser application. In this way, the user is immediately brought to the search page with relevant search results. This process is occasionally termed a "direct search" herein. The search term may be derived from the native application which in turn may derive from the context of the IPTV. Such a context could be metadata from a currently playing content item, e.g., on a Blu-ray® disc in a Blu-ray® player, or from a TV channel. The second display application may be a web application or a native remote controller or other application. In this way, the user is saved the trouble of having to open the second display application and perform the search manually, reducing the difficulties of the systems disclosed above.

Variations of the systems and methods will also be seen. For example, instead of a web application or a native remote controller application, the user may also employ received parameters to perform a direct search as well. Such implementations may be useful when a user is passed keywords or content metadata via e-mail, instant messaging, text messaging, and the like. In this implementation of the invention, the recipient need not navigate to a search facility or second display application in order to perform a search on the same.

In one exemplary implementation, the following steps may be performed. When the native IPTV remote control application launches the second display application, which may be a web application, the search term is added to a launch script (using an API which may be hosted by a server such as a management server) together with the requested action, e.g., to search for similar items. The server then configures the second display application to go directly to the search results upon launch. The server may then redirect the launch URL/URI to the second display application. The second display application loads on the second display, e.g., in a browser therein. The second display application automatically uses a search service to search for the term which had been set by the server. The second display application then shows the search results on the second display.

Where the second display application is not a web application, analogous steps may be performed, but the same are then performed in the context of the native application.

In this way, the user can directly launch a search within the context of the second display application, without having to load the second display application in a separate initial step.

The second displays serve as a visual aid to the IPTV, but generally do not require additional investment by the user because the same make use of a device, e.g., a smartphone, laptop computer, tablet computer, an internet appliance, etc., which most users would already have in their possession. Such a second display provides a complementary functionality to a content playback device such as an IPTV because of the second display's strength in supported languages and character font sets, data entry, processing power, and user experience in content management.

Where the second display application is a web application, the same may be scripting or non-scripting. The second display application may also be a Java application or any other sort of application that may communicate with a server. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls. Where a smartphone is employed, a mobile version of the second display user interface may be employed, with an appropriate listing of fields and an appropriate mobile resolution.

Communications with service providers may take place through a proxy server, and the proxy server presents to service providers the authentication credentials of the content playback device, so that the second displays appear to the service providers as authenticated content playback devices.

As noted above, the second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, Internet appliances, and also on devices specifically designed for these purposes, in which case the special device would include at least a processor and sufficient resources and networking capability to run the second display application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method of operation, a user employing a second display has a user account with a source or clearinghouse of services. Here, the source or clearinghouse is represented as a user account on a management server, but it should be understood that the user account may be with a service provider directly. The user account may have information stored thereon related to what content playback devices are associated with the user account. When a user logs on, they may see this list of content playback devices and may choose a particular content playback device. If there is only one content playback device on the network, or if the user is browsing in a way that the content playback device identity is not needed, then this step may be omitted. Moreover, a user may control content playback devices that are not included in a user account. For example, content playback devices may be discoverable and controllable, e.g., via infrared or Bluetooth® or the network or otherwise, that are not part of the user account with a management server or with a service provider. It may even be possible for a user to playback content on such a content playback device, if a service provider has made available content that can be delivered without access made to a user account.

Once a content playback device has been chosen, a list of services may be displayed. The list of services may be customized to those that have content playable on the chosen content playback device, or all available content may be displayed, in which case, e.g., a notation may be displayed adjacent the content item as to whether it is playable on the selected device. Such customization may also apply to the search results obtained as a result of the direct search routine, as described in greater detail below.

Where no content playback device has been selected, all available content may be displayed. If no content playback device has been selected, but the user account includes stored information about which content playback devices are available, then all content may be displayed, or a subset of all content may be displayed based on the known content playback devices associated with the account, or notations may be presented about which content playback devices can play which content, or a combination of these. In some cases, a content service provider may require a content playback device to be chosen so as to determine if content from that service provider may be played back. In other cases, no content playback device need be chosen and the user may simply choose and queue content for later playback by a content playback device to-be-determined at a later time.

Assuming multiple services are available, the user then selects a service to browse. In many cases, access to a service requires becoming affiliated with the service. Details of such affiliation processes are provided in U.S. patent application Ser. No. 12/982,463, filed Dec. 30, 2010, entitled "Device Registration Process from Second Display", owned by the assignee of the present application and incorporated by reference herein.

Once the content playback device is affiliated with the services, the user may choose which service they wish to browse. Where a content playback device has not been chosen, the user may still choose services and browse, but the content offerings may be less specific to a given content playback device. The service presents a list of available content items. The presentation may be in any number of forms, including by category, by keyword, or in any other form of organization. The proxy server presents an authentication credential of the content playback device to the content server. In some cases, credentials for accessing the various services may be stored in the user account, and presented by the proxy server or management server to the content server when needed.

Individual services may employ their own DRM schemes which the current systems and methods may then incorporate. For example, if a video content service provider only allows a predetermined number of devices on which their content may be played back, then this rule may be enforced or duplicated within the context of the current system and method. Moreover, changes to such service provider rules or other parameters may be periodically polled for by the proxy server and/or management server, or the same may be polled for at a subsequent login of the service, e.g., at the time the affiliation is renewed. In other words, upon login, the system and method may poll for and receive a token associated with the given service provider, the token providing information to the system about the service provider as well as about the user account with the service provider.

The system and method may include a management server as mentioned above which, along with the content playback device, communicates with at least one content server such that the content server provides content items for presentation at the content playback device. The system and method may further include a proxy server communicating with the management server and the second displays. In some cases, the proxy server may be merged with the management server, or in other cases a separate proxy server may be provided for each content server or service provider.

In one aspect, the invention is directed to a method of causing a second display application to launch and search on a search item, including: receiving a search item; upon reception of the search item, instantiating a second display application and causing the second display application to search on the search item; and displaying the results of the search.

Implementations of the invention may include one or more of the following. The receiving a search item may include receiving a search term in a search field. The search field may be disposed in a browser on the second display. The search item may include metadata from a content item, a keyword, a search term, a category, an image file, or an audio file. The causing the second display application to search on the search item may include sending an identifier corresponding to the search item to a server along with an identifier associated with an action corresponding to the search item. The action corresponding to the search item may be to find assets or services related to the search item. The assets or services may be related to the search item by metadata. The search item may include metadata from a content item, and the receiving a search item may include receiving metadata from a Blu-ray® disk or from a streamed video program. The method may further include displaying a prompt for a user to create a shortcut associated with the search to be directly launched, and upon user input, creating the shortcut. The second display application may be a native remote controller application. The second display may be a tablet computer, a smart phone, a laptop computer, a desktop computer, an internet appliance, or a computing device with internet access. The displaying the results of the search may include only displaying services for which the second display or an associated content playback device are affiliated, or may include displaying services for which the second display or an associated content playback device are unaffiliated, and further comprising displaying a screen or a link whereby the content playback device or the second display may become affiliated with the service.

In another aspect, the invention is directed to a non-transitory computer-readable medium, comprising instructions for causing a computing device to implement the above method.

In another aspect, the invention is directed to a method of causing a second display application to launch and search on a search item, including: receiving a search item; upon reception of the search item, adding the search item to a launch script; sending a signal to configure a second display application to instantiate a search results page upon launch; redirecting a launch URL/URI to the second display application; and returning search results to the second display for display.

Implementations of the invention may include one or more of the following. The receiving a search item may include receiving a search term entered in a browser. The method may further include performing a search on services or assets similar to the search item, where the similarity may be in metadata. If a found service is unaffiliated with a user account or content playback device associated with the second display, the method may further include causing the display of a link or page where a user account or content playback device associated with the second display may become affiliated with the service.

In another aspect, the invention is directed to a non-transitory computer-readable medium, comprising instructions for causing a computing device to implement the above method.

Advantages of certain embodiments of the invention may include one or more of the following. A direct search as described here allows the seamless searching of a large array of service provider offerings from within the confines of an already used native application, negating the need to search separately or to separately open a second display application.

Other advantages will be apparent from the description that follows, including the figures and claims.

BRIEF DESCRIPTION OF THE DRAWINGS

Like reference numerals denote like elements throughout.

FIGS. 7(A)-(C) schematically illustrate how a user interface on a second display, particularly one associated with a native application, can lead to the launching of a second display application with search results automatically entered and searched on.

DETAILED DESCRIPTION

Figure 1:
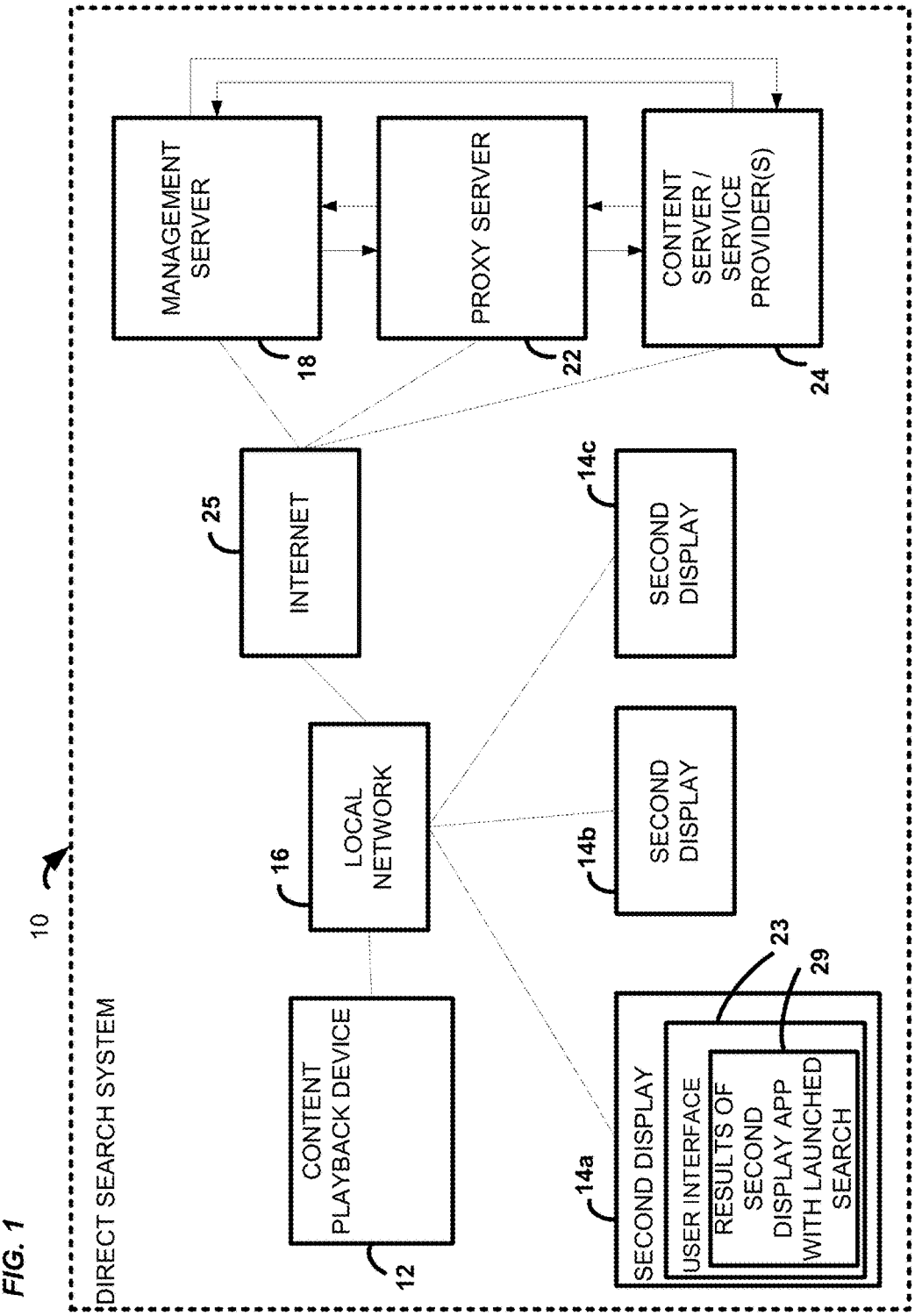
FIG. 1 is a block diagram of an exemplary system in accordance with one aspect of the present principles.

Referring initially to FIG. 1, a direct search system 10 is shown including a content playback device 12 coupled to a local network 16, which may be wired, wireless, or a combination of both. Also coupled to the local network 16 are one or more second displays 14a-14c, an exemplary one of which is (in below figures) termed second display 14i. A number of servers may be accessed by the content playback device 12 and the second display 14i through the local network 16 and the internet 25, including a management server 18, a proxy server 22, and one or more content servers 24 corresponding to service providers (only one is shown in FIG. 1).

The second display 14a includes a user interface 23 for a second display application which when launched may in turn automatically perform a search on a desired search item, the nature of which is described in greater detail below, and the results of which are illustrated as search results 29. For example, if a user is playing a Blu-ray® disc, watching IPTV channels, or browsing the Internet, various opportunities will be seen on which to search. For example, a user may desire to search content related to that being watched on the Blu-ray® disc, e.g., similar movies, sequels, or the like. If a user often performs the same search, they may set that search as a default, and in that case the search and second display initialization may be accomplished by clicking an icon or the like.

A search is generally made of assets and services available or accessible by a server, e.g., the management server and the accessible content servers. The results of the search may be displayed on the second display user interface 23 or on the content playback device 12. Where the search finds an asset, the same may be generally listed on the second display and subsequently played back on the content playback device 12, although in some cases, the asset may also be played back on the second display 14a.

An authentication credential of the content playback device may also be logged with the user account, this credential often required for access to services and content items. In some cases, a found asset or service may be automatically launched, and in this case, the same may access the authentication credential, or receive the same from the content playback device, if required to perform the launch.

Using the system 10 of FIG. 1, a user of the second display 14a is provided with a convenient way to perform a search so as to directly initialize the second display application with the search results loaded. In this way, the user is saved the inconvenience of having to initialize the second display application, enter a search term, and perform the search. The convenient and flexible user interface 23 of the second display 14a may then be leveraged to choose content from the found results for playback on the content playback device 12.

Details of individual components are now described.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will generally be exemplified by an IPTV, in which case it will typically include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories disclosed below to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet 25, or between the second display 14i and the internet, may also take place through means besides the local network 16. For example, the second display 14i may communicate with the content playback device 12 through a separate mobile network.

The one or more second displays 14a-14c each bear a processor and components necessary to operate an application for, e.g., service provider and content selection, as well as for client aspects of a direct search system. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories disclosed below to undertake present principles. Further, the second display 14i can receive user input signals from various input devices including a point-and-click device such as a mouse, a keypad, a touchscreen, a remote control, etc. A network interface such as a wired or wireless modem communicates with the processor to provide connectivity to the local network and to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the instantiation of an application. The implementation discussed here includes a web application, but it will be understood that other types of applications may also be employed as described above.

The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Responsive to a user selection of an item on the list, the second display 14i sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14i, which is presented on the second display 14i so that the user can navigate to enter a selection. Responsive to the selection, the second display 14i sends a command to the content playback device 12 to access and play back the selection.

The command to play the local content item may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulates the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
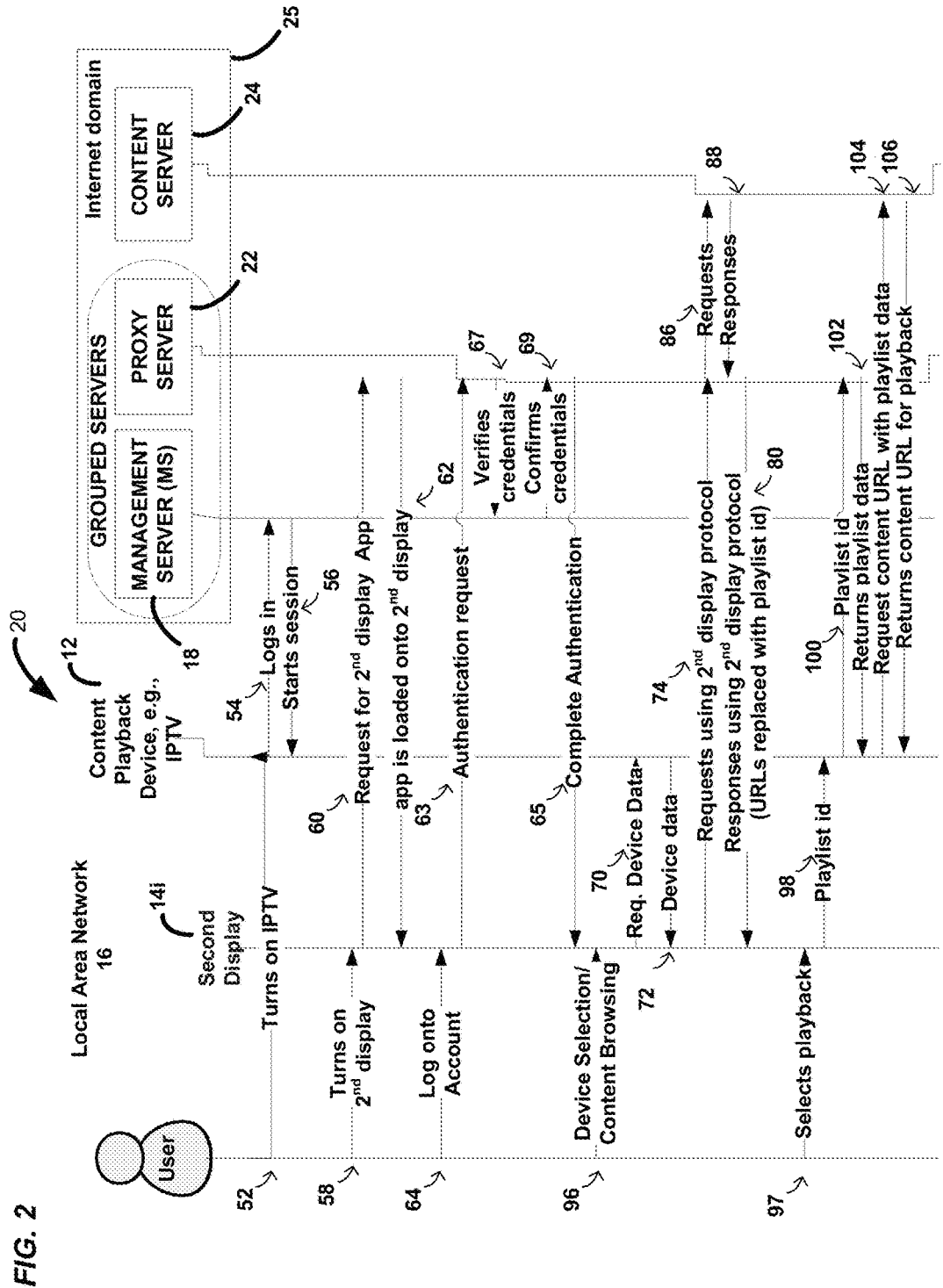
FIG. 2 is a sequence diagram illustrating a method according to another aspect of the present principles.

FIG. 2 is a sequence diagram illustrating an exemplary implementation of a method for enabling a user to employ a second display to browse content playback devices, service providers, content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and instantiates a web browser session in which control may be exercised over the content playback device. Other types of sessions may also be employed as has been noted. A utility is executed on the second display 14i, at state 60, which sends a request to the proxy server 22, which returns in state 62 a web application, e.g., HTML with JavaScript, for the second display to execute for browsing services and content items. This application may make, e.g., asynchronous JavaScript and XML calls to the proxy server 22 and to the content playback device 12 to obtain information to control the content playback device 12.

At state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14i in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14i, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14i, using the local IP address returned as noted above, accesses the content playback device directly, in the sense of communicating through the local network. To select a particular content playback device, the second display 14i requests information about the content playback device 12 at state 70, including language information, digital rights management (DRM) information, etc., as desired, which information is returned from the content playback device to the second display 14i at state 72. Since the second display 14i knows the IP address of the content playback device 12 and consequently communicates directly with the content playback device 12, the second display 14i communicates using a local web address of the content playback device 12 that need not be globally addressable, and may so communicate as long as the second display 14i and content playback device 12 are on the same local network.

Each second display 14i may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on the second display. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned, e.g., in extended markup language (XML) format, to the proxy server 22 which relays the content items, assets, categories, services, etc., available for selection to the second display at the state 80.

The content available for selection is presented on the second display so that the user can navigate (in state 97) the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to a "recently viewed" list and selecting the last video played after switching control to the desired device.

The above description has been for the case where the proxy server 22 is employed to hide the content source, e.g., a content URL, from the second display 14*i*. That is, the proxy server 22 provides an API for the second display to use so that the content and/or content URL cannot be accessed directly. In this way, the details of the management server transactions to access the services remain desirably unknown. In many cases, the second display 14*i* may have stored thereon little or no details about the content playback device 12. In some cases, however, the URL may be directly provided from the proxy server 22 or the proxy server 22 may even be bypassed, e.g., in cases where the content item is intended for free distribution, e.g., movie trailers or the like. Similarly, while the above description has focused on content item playback on content playback device 12, certain content items, e.g., those which are intended for free distribution, may be played back on the second display 14*i* itself, if the same has been appropriately configured.

In the case where multiple second displays request content to be played at or near the same time, a simple rule such as the first-in-time may prevail. Alternatively, a priority scheme may be configured, such that certain second displays take precedence over other second displays. Alternatively, a plurality of user profiles may be employed, and precedence may be based on the identity of specific users.

The control device may command the content playback device to play content by sending, to the content playback device over the local network, commands coded as if they were sent from an infrared remote control, e.g., the commands may be in the Sony Infrared Remote Control System (SIRCS) protocol.

Figure 3:
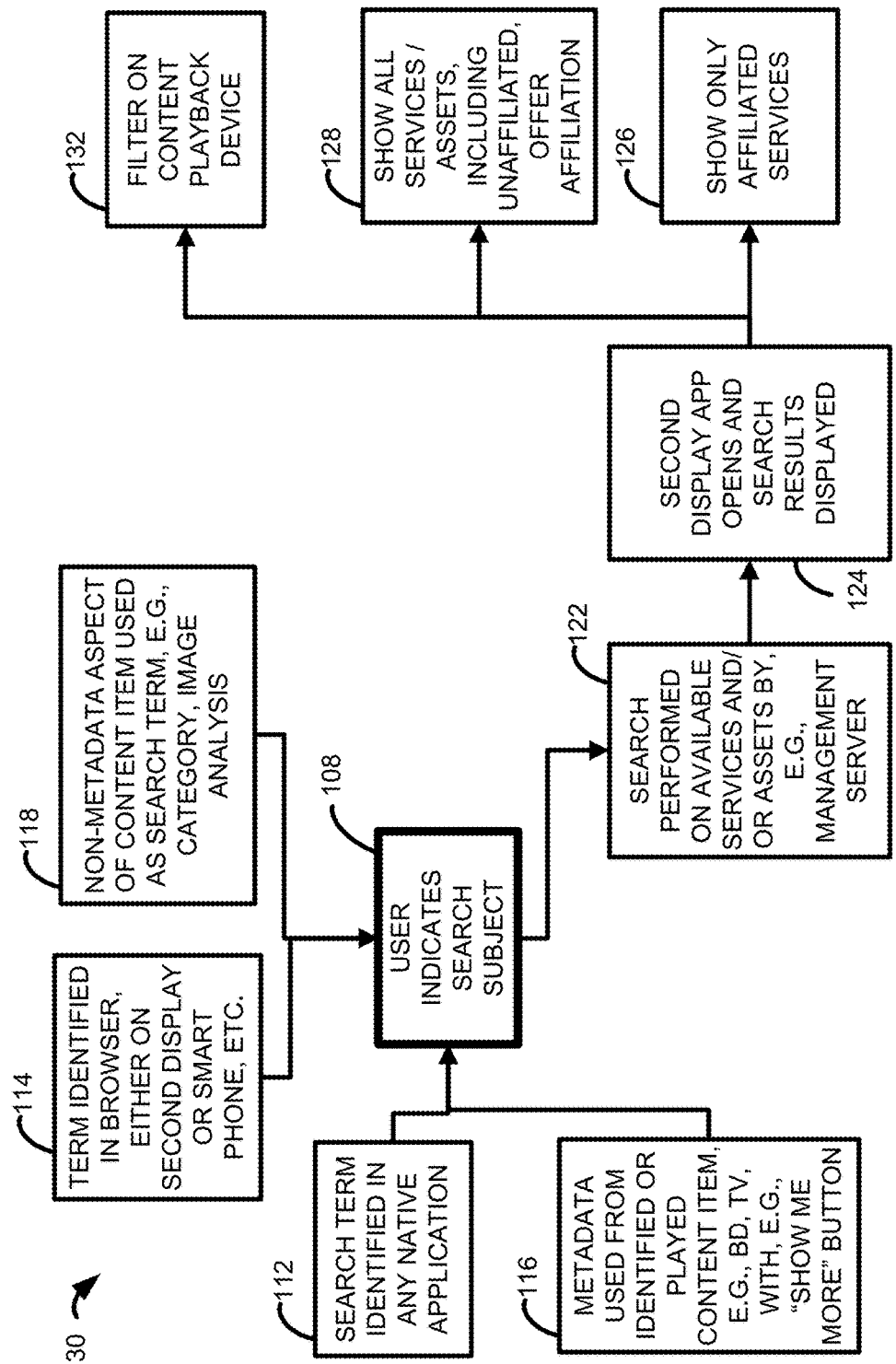
FIG. 3 is a flowchart illustrating an exemplary method according to a further aspect of the present principles.

FIG. 3 illustrates a general method 30 by which a direct search and second display launch may be performed. The method 30 is meant to be illustrative, and illustrate steps performed by both a server and a second display.

A first step is that a user indicates a search subject or search item (step 108). The search subject or search item may be indicated in a number of ways, and the same may constitute a number of different types of data objects.

For example, a search term may be identified in any native application (step 112). For example, a native application on the second display may take the form of a remote controller application. The remote controller application may then control any or all aspects of playback of content playback devices on the system, e.g., digital video recorders, Blu-ray® disc players, or other such devices. In the remote controller application, a term may be identified and then used as a search item. In many cases, the native application will have a search field built in. In other cases, the native application will provide a number of fields that describe a content item that is being played back. For example, the native application may indicate that a song from a given album is being played back. By an act of the user, an aspect of the played-back song may be used in a search. For example, the user may highlight the album name, click on the same, and retrieve search results relating to that album name. In the same way, a search field may be provided in which a user may enter a search term. Other search facilities within a native application will also be understood.

Another way for a user to indicate a search item or subject is to have the term identified in a browser. That is, the second display may have a browser invoked, and the same may be pointed to a given webpage. A term may be identified in the webpage and then used in the direct search system (step 114). For example, the browser may include a search entry field, or clicking on a term in the browser window may lead to a search being performed on the clicked-on term. In another implementation, a website may have a content item featured or otherwise listed: by dragging an icon or the like associated with the content item on to a screen region associated with a server, e.g., the management server, the same may be directed to search on metadata associated with the content item to find like items throughout the management server ecosystem.

Another way for a user to indicate a search item or subject is to use metadata found from identified or played content items (step 116). For example, a user may be playing back a television show or playing a movie from a BD. In either case, metadata will generally be available from the streamed or played back content. It will be seen that this step may overlap in some cases with step 112, at least where the search term in step 112 constitutes metadata. Such metadata may include, e.g., genre or rating information. By clicking on an icon or column heading corresponding to the same, services or assets may be found that are similar to the subject item. In a specific implementation, the remote controller software operating the given content playback device running on the second display may include a "SHOW ME MORE" button that when clicked finds similar content items, or services offering similar content items, as may be available from the server.

Another way for a user to indicate a search item or search subject is to use a non-metadata aspect of a content item (step 118). For example, a user may search for items similar to a given image, once the image has been subjected to some level of image analysis. In the same way, a user may search on a particular category of services or assets. It will be understood, of course, that in some implementations category data is stored as metadata.

Once a user has indicated the search subject or search item, a search is performed on available services and/or assets by the server (step 122). The server may search a listing of associated content providers, as well as content offerings from those content providers. The second display application then is instantiated and the search is run and results displayed (step 124).

A number of steps may be taken once the results are found, to provide different sets of results. In one step, the found results may be filtered based on known content playback devices (step 132). For example, a user may have a limited number of types of content playback devices, and the existing content playback devices may not be able to play back all the assets found. In this case, the found results may be filtered so that only those are shown that are capable of being played by the user.

In another example, if the search results include a number of found services, the results may be filtered such that services are only displayed for which a user has an affiliation set up (step 126). In this way, a user need not sift through a large number of results, many of which may be unavailable to the user due to lack of affiliation.

In a related example, all found services may be displayed to the user, including unaffiliated ones, but the user may be offered an option to create an affiliation with the same (step 128). In this way, a user may have more results to sift through, but they may be conveniently given the option to create an affiliation to playback a found result.

Figure 4:
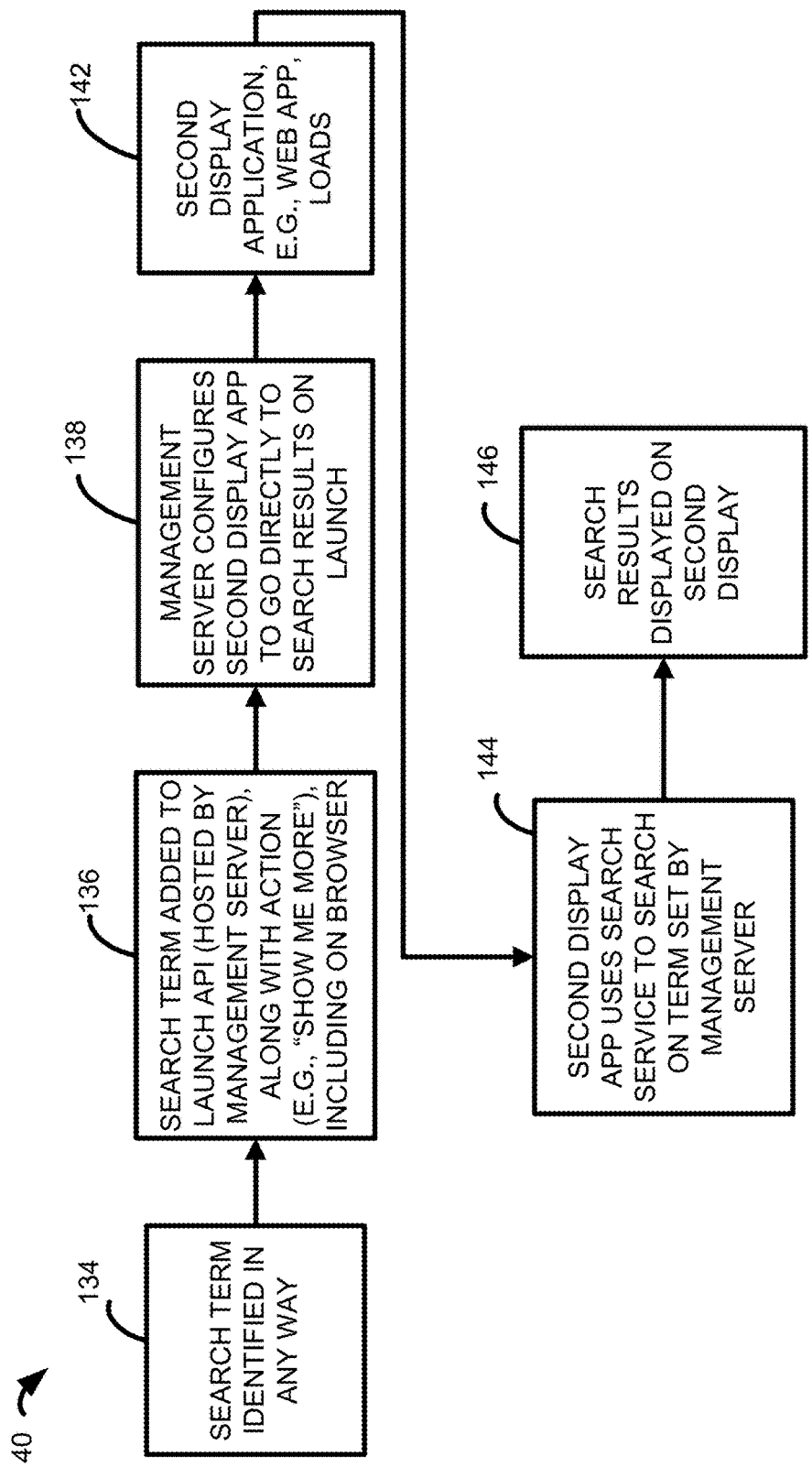
FIG. 4 is a flowchart illustrating an exemplary method according to yet another aspect of the present principles.

FIG. 4 illustrates a flowchart 40 that describes in greater detail how a search term is used in combination with a second display application initialization to provide search results upon launch. In a first step, a search term is identified in any way (step 134). The various ways have been noted in FIG. 3 by steps 112, 114, 116, and 118. Other ways will also be noted. A next step in the flowchart 40 is that the search term is added to a launch script using an API, which is generally hosted by a server. The particular action requested may also be added to the launch script where necessary or where not clear from the context, e.g., "SHOW ME MORE", "FIND SIMILAR GENRE", etc. where no action is supplied, a default action may be defined, e.g., "SHOW SIMILAR ITEMS".

The management server then verifies the credentials of the request (using, e.g., referrer_id, user_token, or the like), and sets the search term and action, configuring the second display application to go directly to a set of search results upon launch (step 138). The second display application, e.g., a web application, then loads (step 142), and, if a search term is set, employs a search service to search on the terms set by the server in steps 136 and 138 (step 144). The nature of the search service or facility may include such as is generally known. The search results are then displayed on the second display (step 146).

Figure 5:
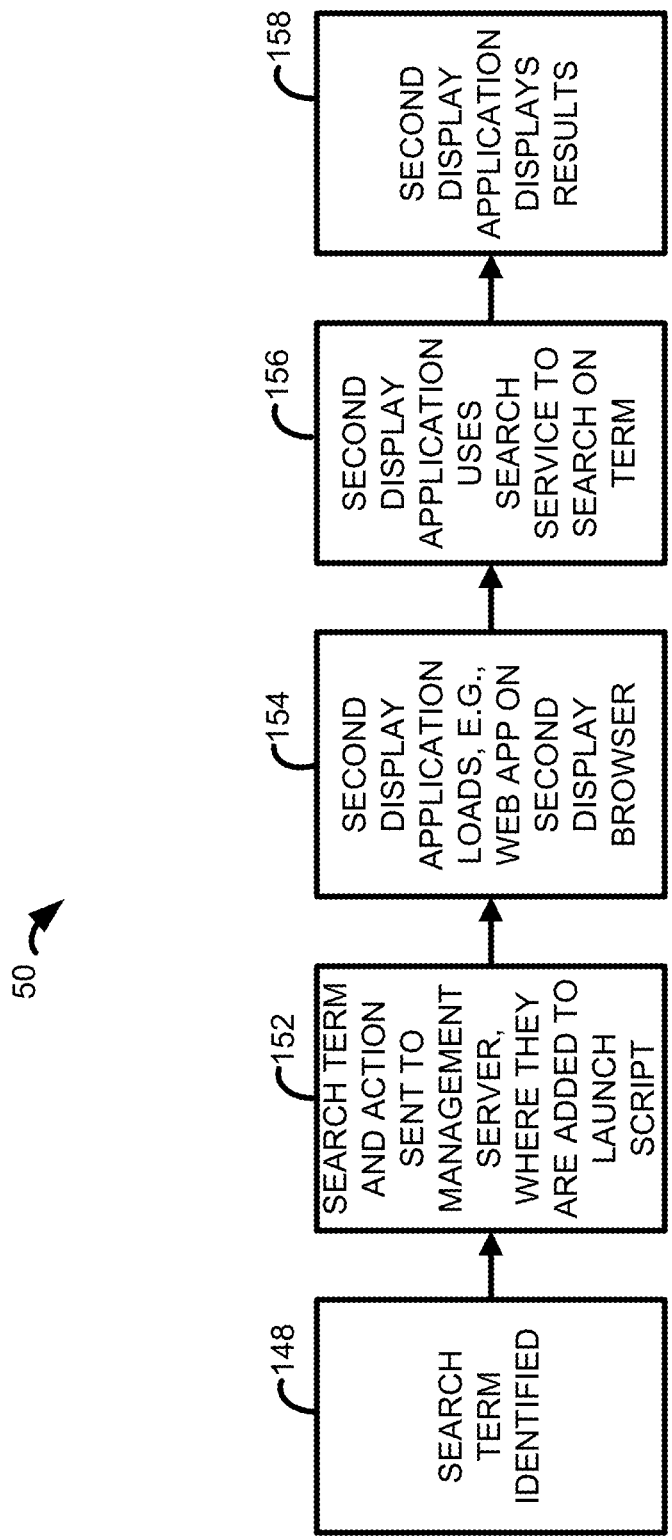
FIG. 5 is a flowchart illustrating an exemplary method according to a further aspect of the present principles.

FIG. 5 illustrates a flowchart 50 where the method steps are specifically for a second display. In a first step, the search term is identified by the methods noted above (step 148). A next step is that the search term and associated action, if necessary, are sent to a server, where they are added to a launch script (step 152). The second display application then loads on the second display (step 154). The second display application employs the search term in a corresponding search (step 156). Finally, the second display application displays the search results (step 158).

Figure 6:
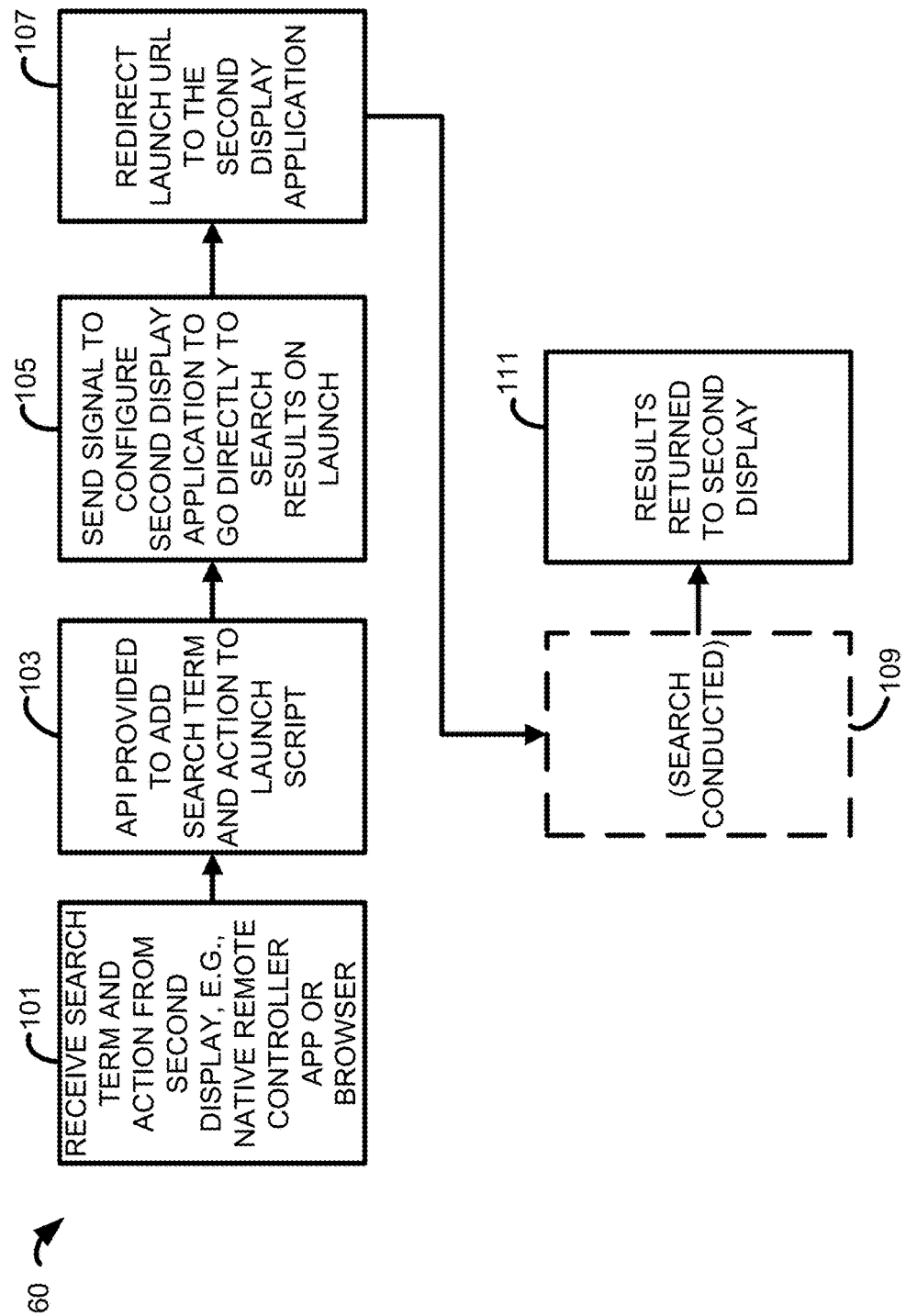
FIG. 6 is a flowchart illustrating an exemplary method according to a further aspect of the present principles.

FIG. 6 illustrates a flowchart 60 where the method steps are specifically for a server. Some of the steps are similar to steps in the flow chart 50, however, flowchart 60 represents the server side of the steps. In a first step, the server receives the search term and the action (if necessary) from the second display, e.g., from a native remote controller application or browser (step 101). A next step is that the search term and action are added to the launch script by the server API (step 103). A next step is that a signal is sent from the server to the second display to configure the second display application to go directly to the search results upon launch of the second display application (step 105). The server then causes redirection of the launch URL or URI to the second display application (step 107). The search is then conducted (step 109). The search may be conducted on the given server or on a separate server. The results of the search are then returned to the second display (step 111).

Figure 7:
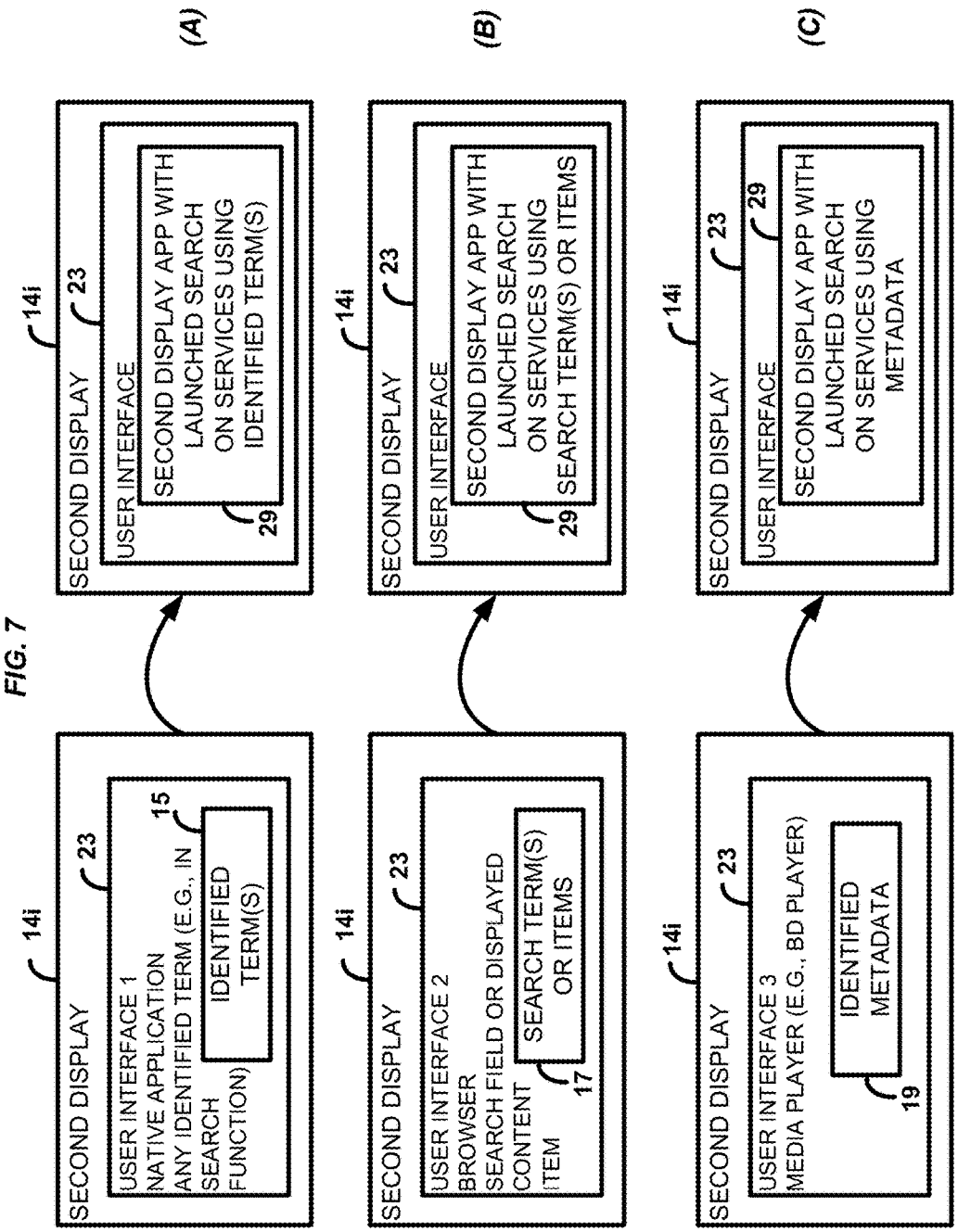

FIGS. 7(A)-(C) schematically illustrate how a user interface on a second display, particularly one associated with a native application, can lead to the launching of the second display application with search results automatically entered and searched on. In FIG. 7(A), a second display 14*i* is illustrated with a first user interface 23 corresponding to a native application. An identified term 15 is illustrated which may correspond to any identified term in the first user interface, e.g., those identified in step 112 of FIG. 3. FIG. 7(A) then illustrates (right side) how a second display application 29 may be initialized with a launched search on services and assets using the identified term 15. In FIG. 7(B), a second display 14*i* is illustrated with a second user interface 23 corresponding to a browser application. An identified term 17 is illustrated which may correspond to a term in a search field or a term in a browser window, e.g., those identified in step 114 of FIG. 3. FIG. 7(B) then illustrates (right side) how a second display application 29 may be initialized with a launched search on services and assets using the identified term 17. In FIG. 7(C), a second display 14*i* is illustrated with a third user interface 23 corresponding to a media player application, e.g., for operating a BD player. An identified term 19 is illustrated which may correspond to any identified term in the first user interface, e.g., those identified in step 116 of FIG. 3, e.g., metadata from a content item. FIG. 7(C) then illustrates (right side) how a second display application 29 may be initialized with a launched search on services and assets using the identified term 19.

Aspects of various components are described below.

Figure 8:
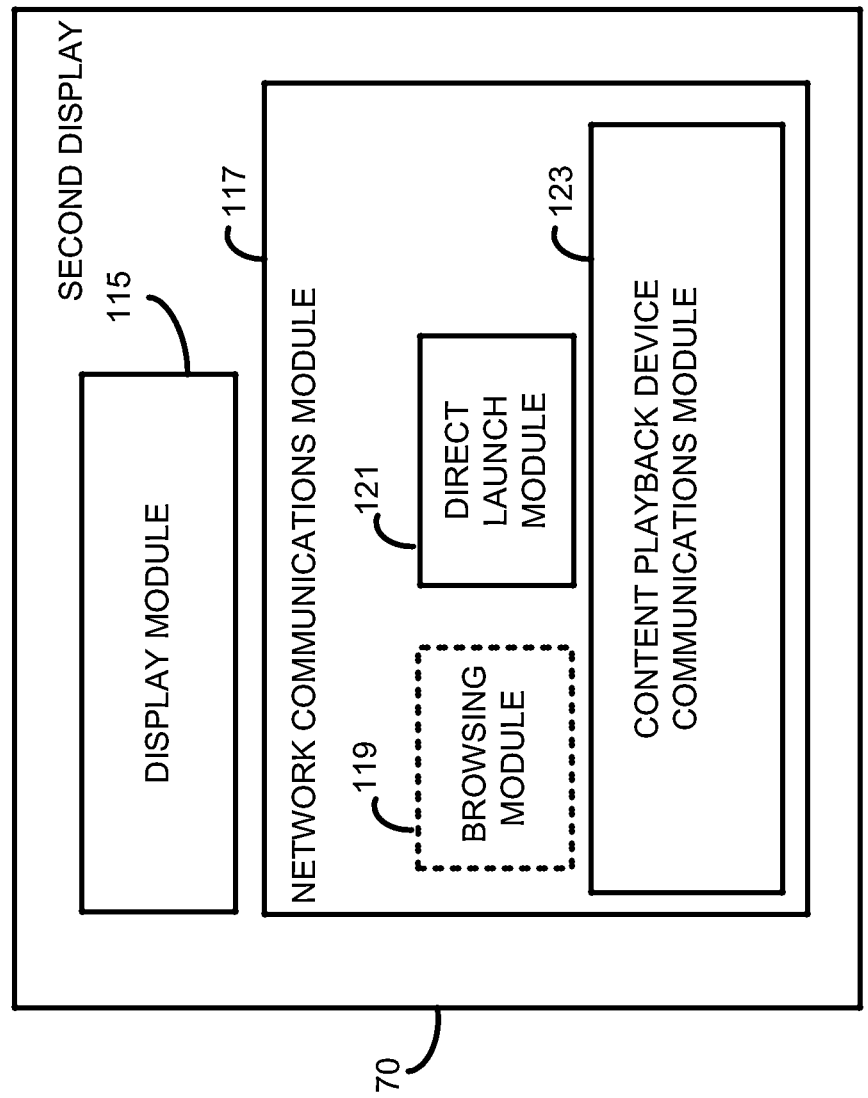
FIG. 8 is a block diagram of an exemplary modular second display system in accordance with a further aspect of the present principles.

FIG. 8 illustrates one implementation of a second display 70. The second display 70 includes a display module 115 for use in, e.g., browsing services and displaying search results. The display module 115 may also be employed in browsing lists and selecting items related to the content playback device. For example, a list of content playback devices accessible to the local network and/or addressable by the second display may be displayed using the display module 115, and the user may choose a content playback device from among them. In addition to choosing content playback devices, a user may review a list of accessible service providers using the display module 115. For example, such service providers may include those offering video-on-demand services for movies and other video content, audio content, or any number of other sites on which content may be browsed and selected. In one implementation, where a content playback device has been chosen, the results may be filtered based on the capability of the content playback device to render the content. In another implementation, the display module 115 may display not just content accessible to the local network, but also content resident on the local network, such as content stored on a digital video recorder or Blu-ray® player.

In some implementations, the display module 115 may be a module that produces an output signal for display by another device. In this case, the actual display may be external to the second display itself. For example, in the case of a Blu-ray® player being used as a second display, the display module 115 may be a unit that produces, e.g., an HDMI output signal, while the actual display may be performed by the TV that is connected to that HDMI output.

The second display 70 also includes a module for network communications 117 that allows the second display to communicate with the local network as well as, in some cases, specific devices directly. In particular, as part of the network communications module 117, a communications module 123 for communications with a content playback device is provided. The content playback device communications module 123 allows the second display to communicate with the content playback device either over the local network, via the internet, or directly. Such direct communications may include various types of wired or wireless transmission schemes, including WiFi, USB, infrared, Bluetooth®, or the like.

Also within the network communications module 163 may be an optional web-browsing module 119 through which the above-noted content items may be browsed in the case where the second display application is a web application. The web-browsing module 119 may be implemented in a number of ways, including by executing application code written in HTML, Javascript, or the like. A web-browsing module implemented in such a way allows the same to be implemented across many platforms, allowing any number of types of second displays to be employed. In some cases, special applications, e.g., helper applications, may be employed to communicate with particular proprietary or non-web-based technologies. Where the second display application is non-web-based, and is written in, e.g., native code, the web-browsing module 119 may be replaced with an analogous module allowing service and content selection and other functionality as has been described, e.g., for selection of content playback devices from within the context of a native remote controller application.

Also within the network communications module 117 may be a direct search launch module 121. The direct search launch module 121 may be employed to perform any of the steps, or a portion of such steps, in FIGS. 3-5.

It is noted that the above modules may be implemented in hardware, non-transitory software, or a combination of the above. Typically, the same will be implemented within the context of a laptop computer, a tablet computer, a smart phone, or the like.

Figure 9:
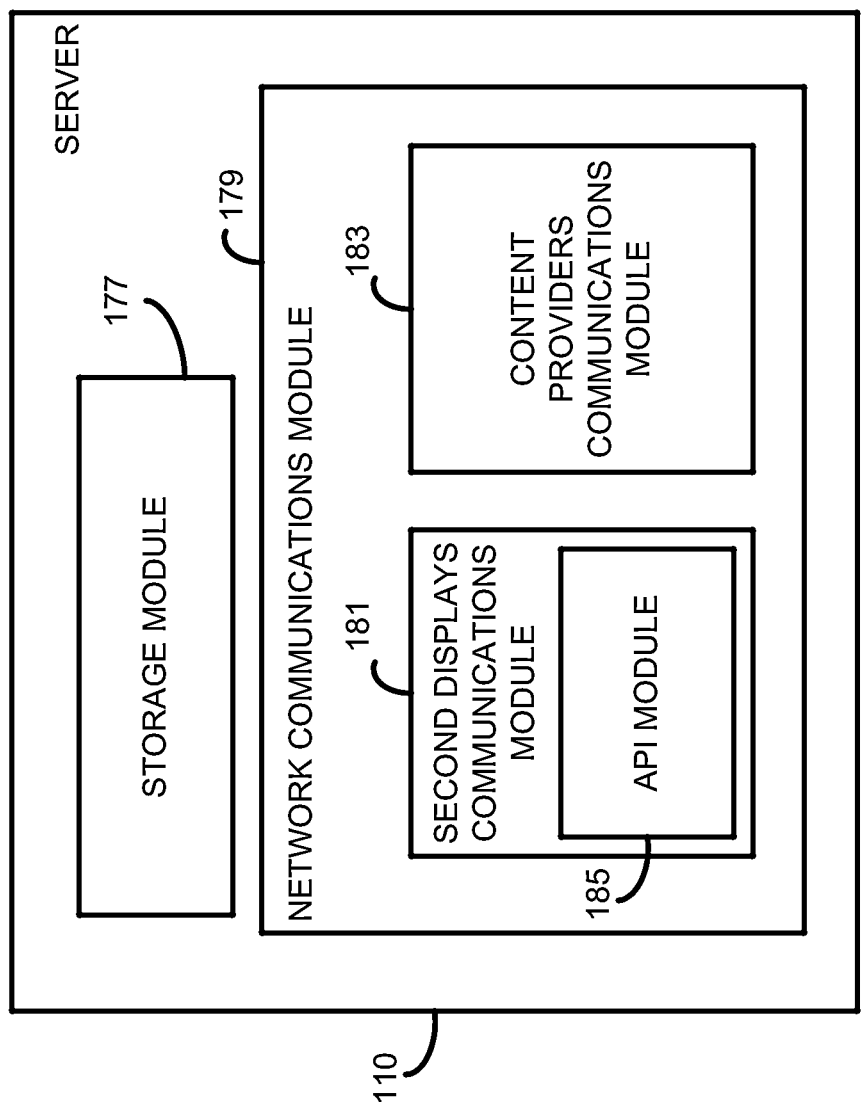
FIG. 9 is a block diagram of an exemplary modular server system in accordance with a further aspect of the present principles.

Referring to FIG. 9, a server 110 is illustrated in which may be implemented certain methods according to the present principles. The server 110 includes a storage module 177 in which may be stored data and computer-executable instructions to implement the functionality described above. To some extent, content may be stored in the storage module 177. However, in general, content delivered to second displays will be stored at, or at least accessible from, service providers and content servers.

The server 110 further includes a network communications module 179. Through the module 179, communications may be had with proxy servers, content providers, and second displays. For example, the network communications module 179 may include a second display communications module 181 through which communications with second displays may be implemented and conducted. The module 179 may further include a content provider communications module 183 for respective communications with content providers. The second display communications module 181 may include an API module 185 allowing manipulation and communication of various second display application parameters. For example, the API module 185 may be employed to add a given search term received from the second display to a launch script, to configure a second display application to go directly to a set of search results on launch, and to direct a launch URL to the second display application.

Figure 10:
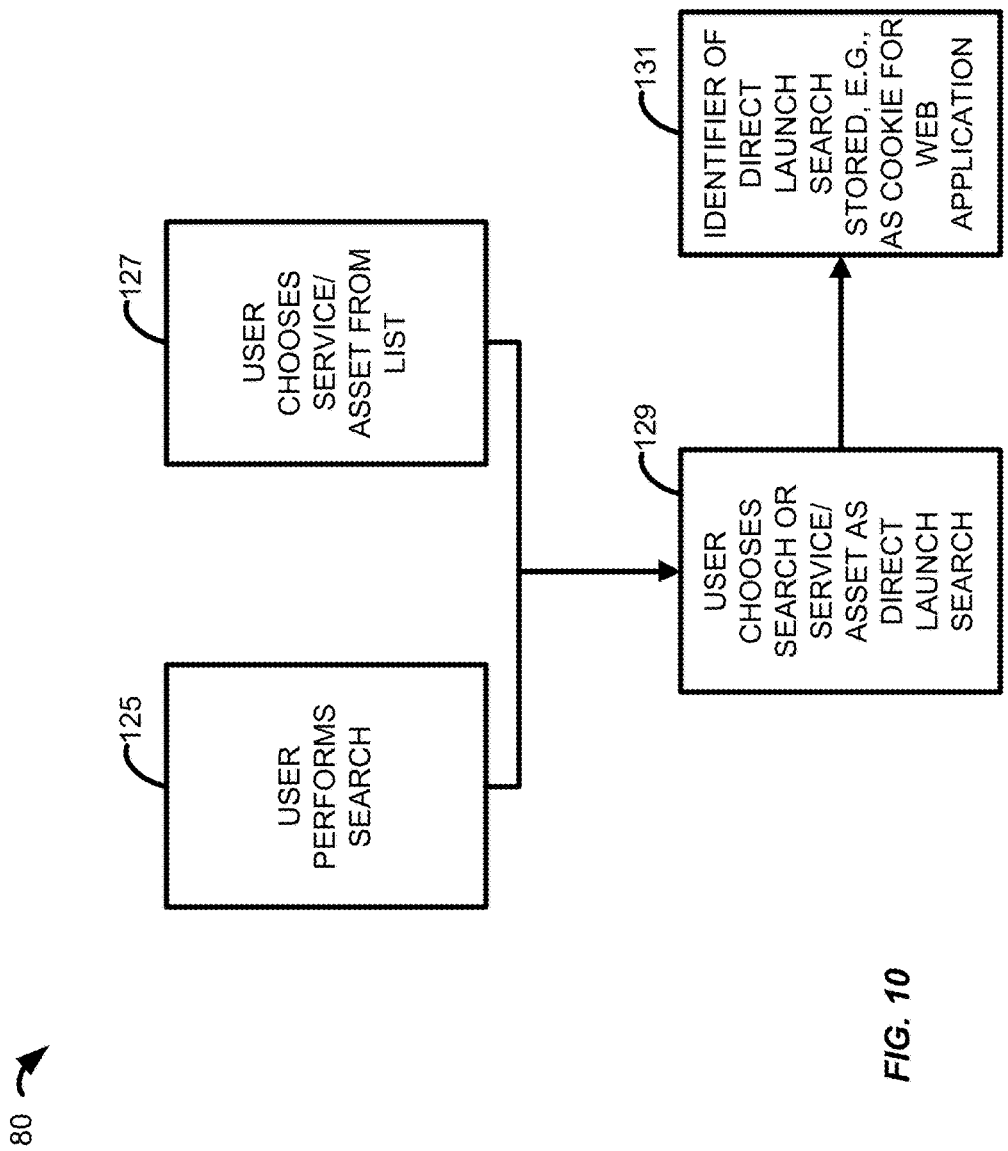
FIG. 10 is a flowchart illustrating an exemplary method according to a further aspect of the present principles.

FIG. 10 is a flowchart 80 illustrating a method which may be employed within the context of the principles described, and in particular to allow storage and reuse of searches. In flowchart 80, a first step is that a user performs a search (step 125). In an alternative implementation, a user may have chosen a service or asset from a list (step 127). If a user commonly performs such a search, or commonly plays a particular asset, or commonly searches a particular service, the user may choose to have the search for a given service or asset stored as a direct launch search (step 129). In this way, by activating a convenient button such as an icon, the user may cause the second display application to initialize with the given search, asset, or service as a search parameter. For example, a user may have an interest in a given artist. By clicking a "SEARCH THIS ARTIST" button set up in a procedure such as step 129, a set of search results in the second display application may be easily retrieved, e.g., the search results relating to new content from the artist or related content. An identifier of the direct launch search may be stored (step 131), e.g., as a cookie where the second display is a web application.

Figure 11:
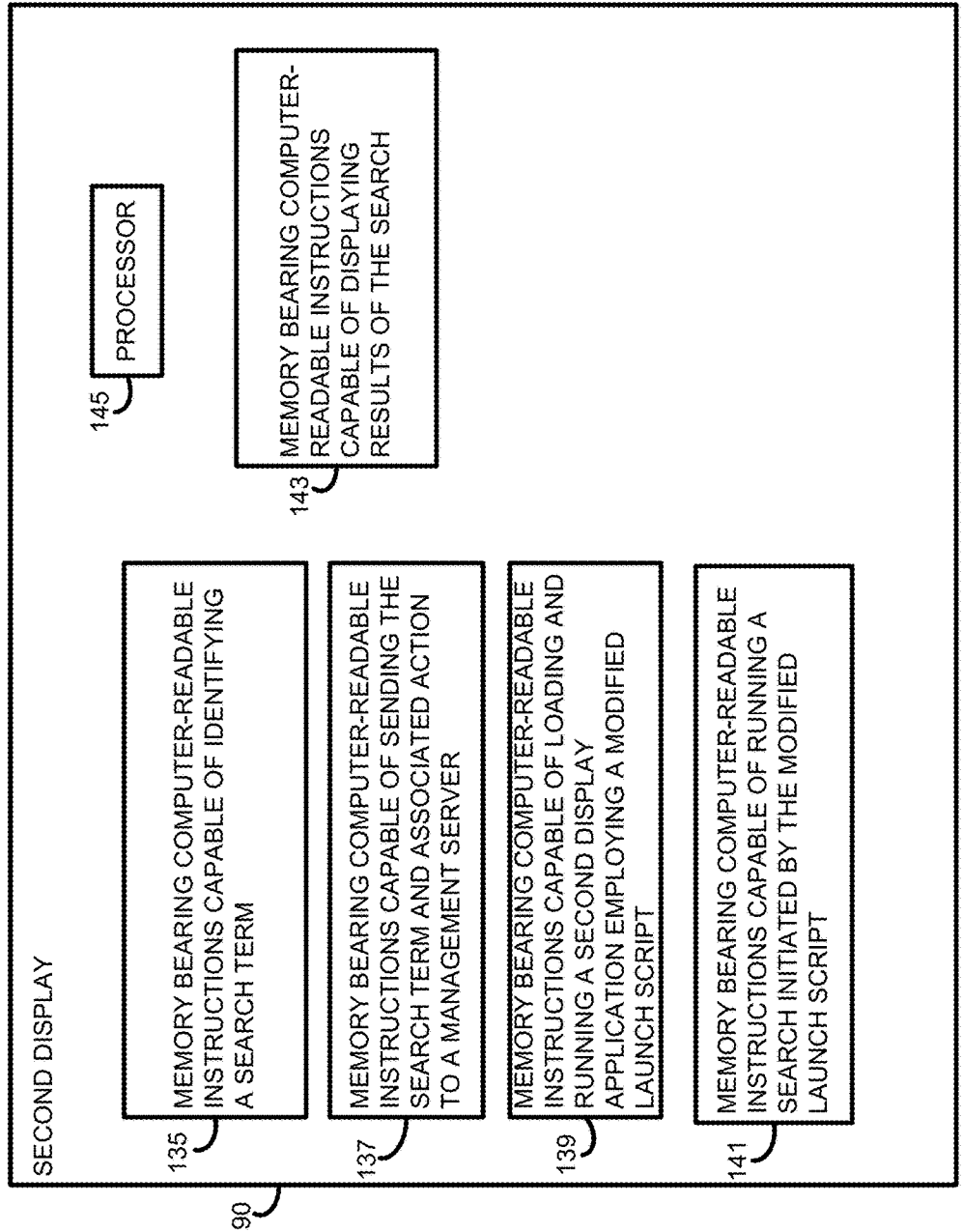
FIG. 11 is a block diagram of an exemplary second display in accordance with a further aspect of the present principles.

Referring to FIG. 11, an implementation of a second display 90 which may operate according to the principles described here is illustrated. In this implementation, the second display 90 includes various memory locations bearing computer-readable instructions capable of performing various steps. First, the second display 90 includes a processor 145 and memory 135 bearing computer-readable instructions capable of identifying the search term. For example, the identified search term may include metadata, data in a search field, data on a browser page, and so on, as has been described above. The second display 90 may further include memory 137 bearing computer-readable instructions capable of sending the search term, and associated action if necessary, to a server such as a management server.

The second display 90 further includes memory 139 bearing computer-readable instructions capable of loading and running the second display application employing a modified launch script. The second display 90 further includes memory 141 bearing computer-readable instructions capable of running a search initiated by the modified launch script. Finally, the second display 90 may further include memory 143 bearing computer-readable instructions capable of displaying the results of the directly launched search.

Other memories will also be understood, including those with instructions which create shortcuts for searches, those which include instructions for native remote controller applications, those which receive and display a list of services associated with the user account, those which filter a displayed service according to a category or the like, and those which provide for user selection of the services and assets, among others.

Figure 12:
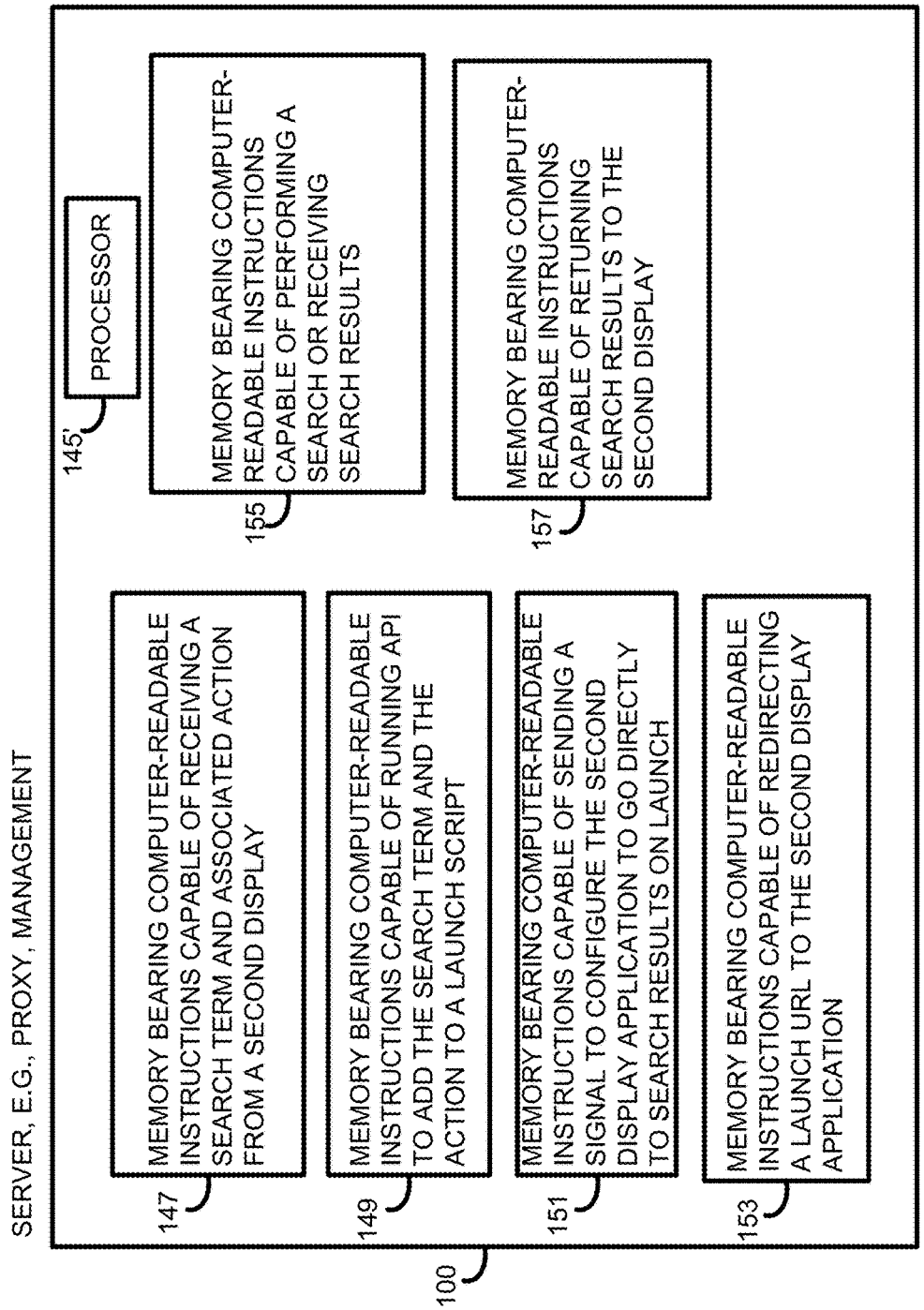
FIG. 12 is a block diagram of an exemplary server in accordance with a further aspect of the present principles.

Referring to FIG. 12, an implementation of a server 100 is illustrated, and as in the case of the second display 90, includes various memories bearing computer-readable instructions capable of performing various steps. The server may be, e.g., a proxy server, a management server, or any other sort of server as described above. The server 100 includes a processor 145 and memory 147 bearing computer-readable instructions capable of receiving a search term, and associated action if necessary, from a second display. The server 100 may further include memory 149 bearing computer-readable instructions capable of operating or running an API to add the search term and the action to a launch script for a second display. The server 100 may further include memory 151 bearing computer-readable instructions capable of sending a signal to configure the second display application to go directly to a set of search results upon launch. The server 100 may further include memory 153 bearing computer-readable instructions capable of redirecting a launch URL to the second display application.

The server 100 may further includes memory 155 bearing computer-readable instructions capable of performing a search or receiving a set of search results. In other words, the server 100 may perform the search itself or a different server may perform the search and deliver the results to the server 100, in either case for subsequent redelivery to a second display. The server 100 may further include memory 157 bearing computer-readable instructions capable of returning the search results to the second display. Other memories will also be understood, although these are not specifically shown in FIG. 12.

Systems and methods have been disclosed that allow improvement of the user experience of the IPTV without adding to the hardware costs of the unit. As disclosed above, users may employ the system and method to directly launch a second display application with a requested search term. Using the described systems and methods, the user need not perform an initial step of initializing the second display application and manually entering a search term.

Figure 13:
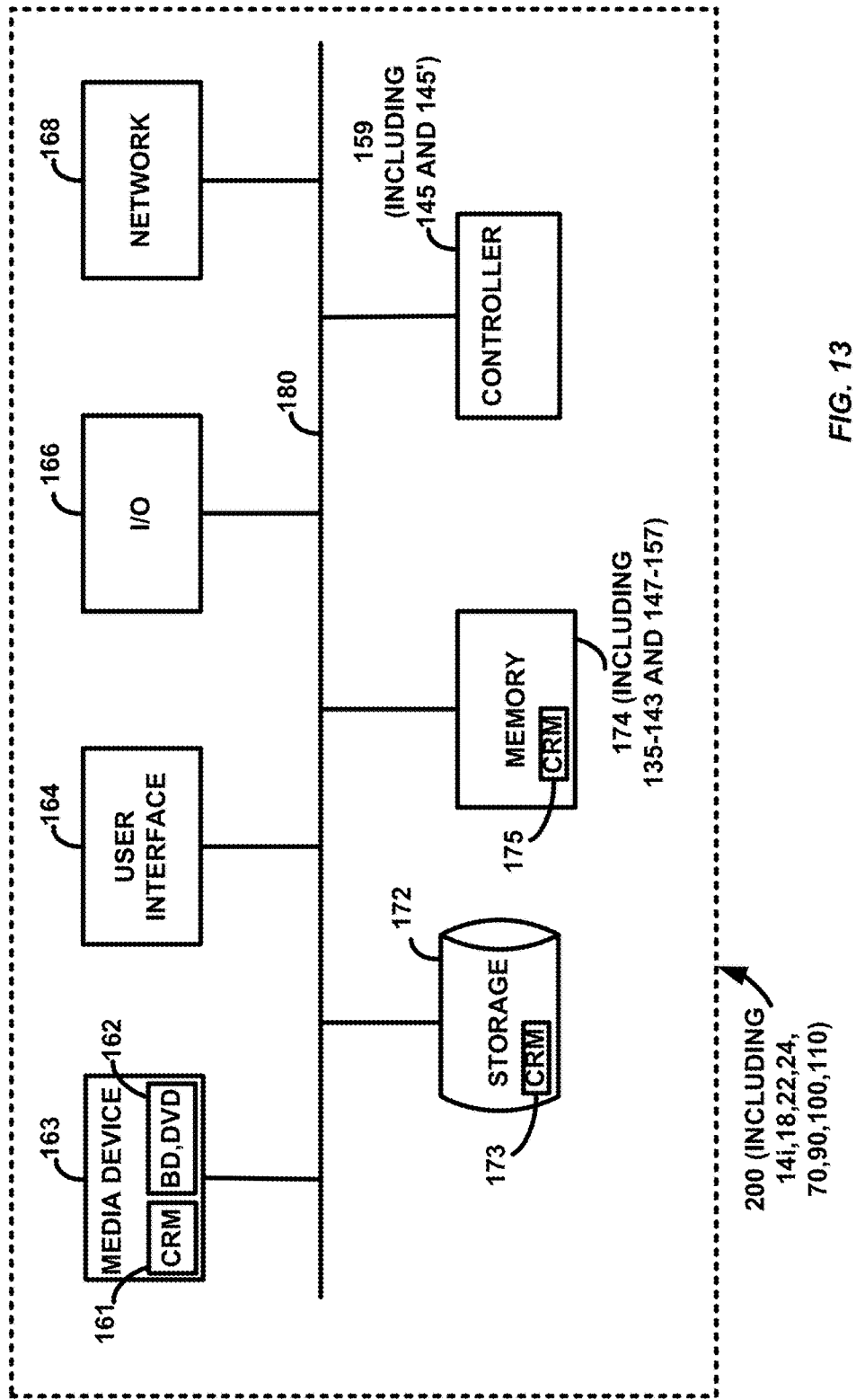
FIG. 13 illustrates an exemplary computing environment, e.g., that of the second display, proxy server, management server, or content server.

One implementation includes one or more programmable processors and corresponding computing system components to store and execute computer instructions, such as to execute the code that provides the second display or various server functionality, e.g., that of the proxy server 22, management server 18, and content server 24. Referring to FIG. 13, a representation of an exemplary computing environment 200 for a second display or for any of the servers is illustrated.

The computing environment includes a controller 159, a memory 174, storage 172, a media device 163, a user interface 164, an input/output (I/O) interface 166, and a network interface 168. The components are interconnected by a common bus 180. Alternatively, different connection configurations can be used, such as a star pattern with the controller at the center.

The controller 159 includes a programmable processor and controls the operation of the second display and servers and their components. The controller 159 loads instructions from the memory 174 or an embedded controller memory (not shown) and executes these instructions to control the system. In its execution, the controller 159 may provide the second display control of a content playback device system as, in part, a software system. Alternatively, this service can be implemented as separate modular components in the controller 159 or the second display.

Memory 174, which may include non-transitory computer-readable memory 175, stores data temporarily for use by the other components of the second display 14*i*, and the same may include memories 135-143 and 147-157, as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display and servers, such as for storing data used by the system. In one implementation, storage 172 is a hard disc drive or a solid state drive.

The media device 163, which may include non-transitory computer-readable memory 161, receives removable media and reads and/or writes data to the removable media. In one implementation, the media device 163 is an optical disc drive or disc burner, e.g., a writable Blu-ray® disc drive 162.

The user interface 164 includes components for accepting user input from the user of the second display, and presenting information to the user. In one implementation, the user interface 164 includes a keyboard, a mouse, audio speakers, and a display. The controller 159 uses input from the user to adjust the operation of the second display 14*i*.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, infrared, or the like.

The second display and servers may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, while media content services have been focused on, the user may also browse services for other types of business or consumer transactions, such as video rentals, home shopping sites, or the like on the second display. Search results may be found that are assets resident within the local network, e.g., content stored on a DVR or Blu-ray® player. In this case, no user account associated with a management server may be necessary. In addition, the second display may also include and manage information about other related devices, such as a media player and a game console.

While the system and method have described implementations in which content playback devices have been selected by a user before browsing, numerous other variations are possible. For example, a cache or cookie or other information may be employed to store information about content playback devices, so that no user choice is necessary. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. It is also noted that certain types of browsing may require no device choice at all, e.g., browsing shopping sites. Even in these implementations, some level of customization may occur, e.g., by consideration of the origination location as detected by the visiting second display's IP address.

In addition, the above description was primarily directed to implementations in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the application for the second display. In many cases, broadcasting methods are primarily directed to native applications, not web applications; however, a broadcasting library may be employed to allow the implementation even within a web application.

While the above description has focused on implementations where a second display is coupled to a content playback device through a local network or over the internet, it will be understood that the same will apply to any method by which the two may communicate, including 3G, 4G, and other such schemes.

Accordingly, the present invention is not limited to only those implementations described above.

The invention claimed is:

1. A computer readable medium, comprising instructions for causing a computing environment to perform a method of causing a second display application to launch and display a search on a search item, the method comprising steps of:
   receiving a search item on a mobile device from a native application;
   transmitting the search item to a server, the server configured to perform a search on the search item and to return a set of results of the search;
   receiving the set of results of the search;
   without a user step of manually opening a second display application, instantiating a second display application; and
   displaying the received set of results of the search within the instantiated second display application, the second display application configured to control content playback on a content playback device.

2. The medium of claim 1, wherein the receiving a search item includes receiving a search term in a search field.

3. The medium of claim 2, wherein the search field is disposed in a browser on the mobile device.

4. The medium of claim 1, wherein the search item is selected from the group consisting of: metadata from a content item, a keyword, a search term, a category, an image file, or an audio file.

5. The medium of claim 4, wherein the search item includes metadata from a content item, and wherein the receiving a search item includes receiving metadata from a Blu-ray® disk content item or from a streamed video program content item.

6. The medium of claim 1, wherein the transmitting the search item to a server includes sending an identifier corresponding to the search item to a server along with an identifier associated with an action corresponding to the search item.

7. The medium of claim 6, wherein the action corresponding to the search item is to find assets or services related to the search item.

8. The medium of claim 7, wherein the assets or services are related to the search item by metadata.

9. The medium of claim 1, further comprising displaying a prompt for a user to create a shortcut associated with the search to be directly launched, and upon user input, creating the shortcut, the shortcut accessible from within the second display application or from within a user interface of the mobile device.

10. The medium of claim 1, wherein the second display application is a native remote controller application.

11. The medium of claim 1, wherein the mobile device is a tablet computer, a smart phone, a laptop computer, an internet appliance, or a mobile computing device with internet access.

12. The medium of claim 1, wherein the displaying the received set of results of the search includes only displaying services for which the mobile device or an associated content playback device are affiliated.

13. The medium of claim 1, wherein the displaying the results of the search include displaying services for which the mobile device or an associated content playback device are unaffiliated, and further comprising displaying a screen or a link wherein the content playback device or the mobile device may become affiliated with the service.

14. The medium of claim 1, wherein the second display application is instantiated upon transmission of the search item to the server.

15. The medium of claim 1, wherein the second display application is instantiated upon the receiving of the set of results of the search.

16. A computer readable medium, comprising instructions for causing a computing environment to perform a method of using a mobile device running a second display application to search on a search item, the method comprising steps of:
   i. receiving a search item on a mobile device;
   ii. initiating a search on the search item;
   iii. receiving a set of results of the search, the set of results corresponding to found content items within services, and without a user step of manually opening a second display application, instantiating a second display application and displaying the set of results within the instantiated second display application, the second display application configured to control content playback on a content playback device;
   iv. receiving a selection of a content item from the displayed set of results; and
   v. launching an application corresponding to the service within which the selected content item is located;
   vi. wherein at least the steps of receiving a set of results of the search and the receiving a selection of a content item from the displayed set of results are performed using & the second display application running on the mobile device.

17. The medium of claim 16, wherein the initiating a search on the search item includes causing a search to be performed on the search item by transmitting the search item to a server, the server configured to perform a search on the search item.

18. The medium of claim 16, further comprising receiving a selection of one of the returned and displayed results of the search, and causing a content item corresponding to the selection to play back on the mobile device within the service.

19. A computer readable medium, comprising instructions for causing a computing environment to perform a method of using a mobile device running a second display application to search on a search item, the method comprising steps of:
   i. receiving a search term on a mobile device;
   ii. initiating a first search on the search item;
   iii. receiving a set of results of the first search, the set of results corresponding to found services with content items corresponding to the search term, and displaying the set of results;
   iv. receiving a selection of a service from the displayed set of results of the first search; and v. launching an application corresponding to the selected service, wherein the launching includes initiating a second search within the selected service for content items corresponding to the search term, vi. wherein at least the steps of receiving a set of results of the first search and the receiving a selection of a service from the set of results of the first search are performed using a second display application running on the mobile device, the second display application configured to control content playback on a content playback device, the second display application instantiated without a user step of manually opening the second display application.

20. The medium of claim 19, wherein the displaying the set of results corresponding to found services includes displaying summary results of content items for at least one of the displayed services.

21. The medium of claim 19, further comprising receiving a selection of one of the returned and displayed results of the second search within the service, and causing a content item corresponding to the selection to play back on the mobile device.

22. The medium of claim 19, further comprising receiving a selection of one of the returned and displayed results of the second search within the service, and causing a content item corresponding to the selection to play back on a content playback device associated with the mobile device.

23. A method of causing a second display application to launch and search on a search item, comprising:

i. receiving a search item on a second display;

ii. upon reception of the search item, instantiating a second display application without a user step of manually opening the second display application, the second display application configured to control playback of content items from one or more content provider services on at least one content playback device using an authentication credential of the content playback device, and causing the second display application to search on the search item; and iii. displaying the results of the search within the second display application, the search results related to the search item relating to services or content items available from one or more content provider services.

24. The method of claim 23, wherein the receiving a search item includes receiving a search term in a search field.

25. The method of claim 24, wherein the search field is disposed in a browser on the second display.

26. The method of claim 23, wherein the search item is selected from the group consisting of: metadata from a content item, a keyword, a search term, a category, an image file, or an audio file.

27. The method of claim 26, wherein the search item includes metadata from a content item, and wherein the receiving a search item includes receiving metadata from a Blu-ray® disk or from a streamed video program.

28. The method of claim 23, wherein the causing the second display application to search on the search item includes sending an identifier corresponding to the search item to a server along with an identifier associated with an action corresponding to the search item.

29. The method of claim 28, wherein the action corresponding to the search item is to find services or content items within content provider services related to the search item.

30. The method of claim 29, wherein the assets or services are related to the search item by metadata.

31. The method of claim 23, further comprising displaying a prompt for a user to create a shortcut associated with the search to be directly launched, and upon user input, creating the shortcut.

32. The method of claim 23, wherein the second display application is a native remote controller application.

33. The method of claim 23, wherein the second display is a tablet computer, a smart phone, a laptop computer, a desktop computer, an Internet appliance, or a computing device with Internet access.

34. The method of claim 23, wherein the displaying the results of the search includes only displaying services for which the second display or the content playback device are affiliated.

35. The method of claim 23, wherein the displaying the results of the search includes displaying content provider services for which the second display or an associated content playback device are unaffiliated, and further comprising displaying a screen or a link whereby the content playback device or the second display may become affiliated with the service.

36. A non-transitory computer-readable medium, comprising instructions for causing a computing device to implement the method of claim 23.

37. A method of causing a second display application to launch and search on a search item, comprising:

i. receiving a search item, the search item having been entered on a second display;

ii. upon reception of the search item, adding the search item to a launch script;

iii. sending a signal to configure a second display application, operable on the second display, to instantiate a search results page upon launch, the second display application configured to control playback of content items from one or more content provider services on at least one content playback device using an authentication credential of the content playback device, such that the second display application is instantiated without a user step of manually opening the second display application;

iv. redirecting a launch URL/URI to the second display application; and v. returning search results to the second display for display, the search results relating to services or content items related to the search item available from the one or more content provider services.

38. The method of claim 37, wherein the receiving a search item includes receiving a search term entered in a browser.

39. The method of claim 37, further comprising performing a search on services or content items within services similar to the search item.

40. The method of claim 39, wherein a similarity is in metadata.

41. The method of claim 37, wherein if a found service is unaffiliated with a user account associated with the second display or the content playback device, causing the display of a link or page wherein a user account or the content playback device associated with the second display may become affiliated with the service.

42. A non-transitory computer-readable medium, comprising instructions for causing a computing device to implement the method of claim 37.

* * * * *